US007968067B2

(12) United States Patent
Geniesse

(10) Patent No.: US 7,968,067 B2
(45) Date of Patent: *Jun. 28, 2011

(54) PROCESS FOR REMOVAL OF ALUMINUM OXIDES FROM AQUEOUS MEDIA

(75) Inventor: Donald Geniesse, Richland, WA (US)

(73) Assignee: Areva Federal Services, LLC, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/760,117

(22) Filed: Apr. 14, 2010

(65) Prior Publication Data
US 2010/0189613 A1    Jul. 29, 2010

Related U.S. Application Data

(63) Continuation of application No. 12/711,482, filed on Feb. 24, 2010, which is a continuation of application No. PCT/US2008/076589, filed on Sep. 17, 2008.

(60) Provisional application No. 60/973,071, filed on Sep. 17, 2007, provisional application No. 61/074,450, filed on Jun. 20, 2008.

(51) Int. Cl.
C01B 33/26 (2006.01)
(52) U.S. Cl. ............... 423/118.1; 423/119; 423/115; 588/1; 588/300
(58) Field of Classification Search ............... 423/118.1, 423/119; 588/1, 300
See application file for complete search history.

(56) References Cited

U.S. PATENT DOCUMENTS

| 2,964,381 | A | * | 12/1960 | Goodenough | 423/181 |
|---|---|---|---|---|---|
| 2,977,185 | A | | 3/1961 | Goodenough | |
| 2,980,490 | A | | 4/1961 | Gulledge et al. | |
| 3,447,897 | A | * | 6/1969 | Moolenaar et al. | 423/122 |
| 3,539,306 | A | | 11/1970 | Kumura et al. | |
| 4,116,858 | A | | 9/1978 | Lee et al. | |
| 4,159,311 | A | | 6/1979 | Lee et al. | |
| 4,348,295 | A | | 9/1982 | Burba | |
| 4,348,297 | A | | 9/1982 | Bauman et al. | |
| 4,471,070 | A | | 9/1984 | Siefert et al. | |
| 4,656,156 | A | | 4/1987 | Misra | |
| 4,774,212 | A | | 9/1988 | Drezdon | |
| 4,883,533 | A | | 11/1989 | Kosin et al. | |
| 4,904,457 | A | | 2/1990 | Misra | |
| 5,075,472 | A | | 12/1991 | Misra et al. | |
| 5,179,063 | A | | 1/1993 | Harris et al. | |
| 5,356,567 | A | | 10/1994 | Ogawa et al. | |

(Continued)

FOREIGN PATENT DOCUMENTS

JP    2003063818 A  *  3/2003

OTHER PUBLICATIONS

Lumetta, G.J., et al., Leaching Methods for Pretreating Hanford Tank Sludges, WM Conference, (2000).*

(Continued)

Primary Examiner — Melvin C Mayes
Assistant Examiner — Melissa Stalder
(74) Attorney, Agent, or Firm — Morgan Lewis & Bockius LLP

(57) ABSTRACT

The present invention relates to the use of lithium salts and/or magnesium salts for the precipitation of aluminum oxides present in aqueous media.

9 Claims, 6 Drawing Sheets

U.S. PATENT DOCUMENTS

| | | | |
|---|---|---|---|
| 5,360,859 A | 11/1994 | Ogawa et al. | |
| 5,364,828 A | 11/1994 | Cox et al. | |
| 5,419,883 A | 5/1995 | Ogawa et al. | |
| 5,885,917 A * | 3/1999 | Ohdan et al. | 501/153 |
| 5,973,220 A * | 10/1999 | Sasaki et al. | 588/4 |
| 5,997,836 A * | 12/1999 | Sato et al. | 423/420.2 |
| 6,479,024 B1 | 11/2002 | O'Hare et al. | |
| 6,746,592 B1 * | 6/2004 | Mok et al. | 205/516 |
| 7,084,085 B2 | 8/2006 | O'Hare et al. | |
| 2003/0006196 A1 * | 1/2003 | Clarke et al. | 210/702 |

OTHER PUBLICATIONS

C. Misra et al., "Composition and Properties of Synthetic Hydrotalcites", Clays and Clay Minerals 40(2): 145-150 (1992).

\* cited by examiner

| STREAM | | | DST INITIAL | DST INITIAL | AL(OH)3 | LEACHED AL(OH)3 | LEACHED AL(OH)3 | 11% LiOH | PRECIP | PRECIP | FILTRATE |
|---|---|---|---|---|---|---|---|---|---|---|---|
| PHASE | | | AQUEOUS | SOLID | SOLID | AQUEOUS | SOLID | AQUEOUS | AQUEOUS | SOLID | AQUEOUS |
| TEMPERATURE, C | | | 25.00 | 25.00 | 25.00 | 90.00 | 90.00 | 25.00 | 91.69 | 91.69 | 65.00 |
| PRESSURE, ATM | | | 1.00 | 1.00 | 1.00 | 1.00 | 1.00 | 1.00 | 1.00 | 1.00 | 1.00 |
| pH | | | 15.16 | - | - | 12.81 | - | 14.24 | 13.14 | - | 13.83 |
| COMPONENT | FORMULA | gm/gmol | gm | gm | gm | gm | gm | gm | gm | gm | gm |
| WATER | H2O | 18.02 | 574.27 | - | - | 574.27 | - | 156.00 | 710.47 | - | 567.73 |
| ALUMINUM HYDROXIDE | Al(OH)3 | 78.00 | 34.95 | 10.47 | 81.50 | 122.78 | 4.14 | - | 12.63 | - | 4.25 |
| POTASSIUM HYDROXIDE | KOH | 56.11 | 11.05 | - | - | 11.05 | - | - | 11.05 | - | 8.85 |
| SODIUM HYDROXIDE | NaOH | 40.00 | 96.95 | - | - | 96.95 | - | - | 126.25 | - | 102.57 |
| SODIUM NITRITE | NaNO2 | 69.00 | 80.37 | - | - | 80.37 | - | - | 80.37 | - | 64.34 |
| SODIUM NITRATE | NaNO3 | 84.99 | 95.41 | - | - | 95.41 | - | - | 36.04 | - | 23.34 |
| SODIUM CARBONATE | Na2CO3 | 105.99 | 6.94 | - | - | 6.94 | - | - | 5.13 | - | 5.56 |
| SODIUM SULFATE | Na2SO4 | 142.04 | 1.04 | - | - | 1.04 | - | - | 1.04 | - | 0.83 |
| SODIUM CHLORIDE | NaCl | 58.44 | 6.81 | - | - | 6.81 | - | - | 6.81 | - | 5.45 |
| SODIUM FLUORIDE | NaF | 41.99 | 0.46 | - | - | 0.46 | - | - | 0.46 | - | 0.37 |
| SODIUM ORTHOPHOSPHATE | Na3PO4 | 163.94 | 1.19 | - | - | 1.19 | - | - | 1.19 | - | 0.95 |
| SODIUM CHROMATE | Na2CrO4 | 161.97 | 0.47 | - | - | 0.47 | - | - | 0.47 | - | 0.38 |
| SODIUM ACETATE | Na(C2H3O2) | 82.03 | 3.35 | - | - | 3.35 | - | - | 3.35 | - | 2.68 |
| SODIUM OXALATE | Na2C2O4 | 134.00 | 0.12 | 0.27 | - | 0.39 | - | - | 0.39 | - | 0.31 |
| CESIUM HYDROXIDE | CsOH | 149.91 | 9.41E-03 | - | - | 9.41E-03 | - | - | 9.41E-03 | - | 7.53E-03 |
| LITHIUM HYDROXIDE | LiOH | 23.95 | - | - | - | - | - | 19.48 | 1.94 | - | 0.65 |
| LITHIUM CARBONATE HYDROTALCITE | Li2CO3·4Al(OH)3·3H2O | 439.95 | - | - | - | - | - | - | - | 7.49 | - |
| LITHIUM NITRATE HYDROTALCITE | 2LiNO3·4Al(OH)3·3H2O | 503.95 | - | - | - | - | - | - | - | 176.01 | - |
| TOTAL, gm | | | 913.39 | 10.73 | 81.50 | 1,001.48 | 4.14 | 175.46 | 997.60 | 183.50 | 788.26 |
| TOTAL, kg | | | 0.91 | 0.01 | 0.08 | 1.00 | 0.00 | 0.18 | 1.00 | 0.18 | 0.79 |
| VOLUME, L | | | 0.70 | 0.00 | 0.03 | 0.79 | 0.00 | 0.15 | 0.83 | 0.07 | 0.65 |
| ENTHALPY, cal | | | -2.861E+06 | -4.212E+04 | -3.230E+05 | -3.158E+06 | -1.632E+04 | -6.905E+05 | -3.253E+06 | -6.114E+05 | -2.589E+06 |

LITHIUM HYDROTALCITE PRECIPITATION

*FIG. 2*

| STREAM | | CAKE 1 | CAKE 1 | WASH 1 | SPENT WASH 1 | CAKE 2 | CAKE 2 | WASH 2 | SPENT WASH 2 | CAKE 3 | CAKE 3 |
|---|---|---|---|---|---|---|---|---|---|---|---|
| PHASE | | AQUEOUS | SOLID | AQUEOUS | AQUEOUS | AQUEOUS | SOLID | AQUEOUS | AQUEOUS | AQUEOUS | SOLID |
| TEMPERATURE, C | | 65.00 | 65.00 | 25.00 | 33.60 | 33.60 | 33.60 | 25.00 | 26.19 | 26.19 | 26.19 |
| PRESSURE, ATM | | 1.00 | 1.00 | 1.00 | 1.00 | 1.00 | 1.00 | 1.00 | 1.00 | 1.00 | 1.00 |
| pH | | 13.83 | - | 7.00 | 13.37 | 13.37 | - | 7.00 | 12.57 | 12.57 | - |
| COMPONENT | FORMULA | gm | gm | gm | gm | gm | gm | gm | gm | gm | gm |
| WATER | $H_2O$ | 141.47 | | 999.85 | 1,047.00 | 94.19 | | 999.85 | 995.84 | 98.21 | |
| ALUMINUM HYDROXIDE | $Al(OH)_3$ | 1.06 | | | 0.28 | 0.03 | | | 0.05 | 0.00 | |
| POTASSIUM HYDROXIDE | $KOH$ | 2.20 | | | 2.02 | 0.18 | | | 0.17 | 0.02 | |
| SODIUM HYDROXIDE | $NaOH$ | 25.56 | | | 23.63 | 2.13 | | | 1.93 | 0.19 | |
| SODIUM NITRITE | $NaNO_2$ | 16.03 | | | 14.71 | 1.32 | | | 1.20 | 0.12 | |
| SODIUM NITRATE | $NaNO_3$ | 5.81 | | | 5.72 | 0.51 | | | 0.58 | 0.06 | |
| SODIUM CARBONATE | $Na_2CO_3$ | 1.38 | | | 0.79 | 0.07 | | | 0.007 | 0.001 | |
| SODIUM SULFATE | $Na_2SO_4$ | 0.21 | | | 0.19 | 0.02 | | | 0.016 | 0.002 | |
| SODIUM CHLORIDE | $NaCl$ | 1.36 | | | 1.25 | 0.11 | | | 0.102 | 0.010 | |
| SODIUM FLUORIDE | $NaF$ | 0.09 | | | 0.085 | 0.008 | | | 0.007 | 0.001 | |
| SODIUM ORTHOPHOSPHATE | $Na_3PO_4$ | 0.24 | | | 0.218 | 0.020 | | | 0.018 | 0.002 | |
| SODIUM CHROMATE | $Na_2CrO_4$ | 0.09 | | | 0.086 | 0.008 | | | 0.007 | 0.001 | |
| SODIUM ACETATE | $Na(C_2H_3O_2)$ | 0.67 | | | 0.612 | 0.055 | | | 0.050 | 0.005 | |
| SODIUM OXALATE | $Na_2C_2O_4$ | 0.08 | | | 0.071 | 0.006 | | | 0.006 | 0.001 | |
| CESIUM HYDROXIDE | $CsOH$ | 1.88E-03 | | | 1.72E-03 | 1.55E-04 | | | 1.41E-04 | 1.39E-05 | |
| LITHIUM HYDROXIDE | $LOH$ | 0.16 | | | 0.042 | 0.004 | | | 0.007 | 0.001 | |
| LITHIUM CARBONATE HYDROTALCITE | $Li_2CO_3 \cdot 4Al(OH)_3 \cdot 3H_2O$ 439.95 | | 196.42 | | | | 2.16 | | | | 2.43 |
| LITHIUM NITRATE HYDROTALCITE | $2LiNO_3 \cdot 4Al(OH)_3 \cdot 3H_2O$ 503.95 | | | | | | 195.16 | | | | 194.81 |
| TOTAL, gm | | 196.42 | 196.42 | 999.85 | 1,096.70 | 98.66 | 197.33 | 999.85 | 999.98 | 98.62 | 197.24 |
| TOTAL, kg | | 0.20 | 0.20 | 1.00 | 1.10 | 0.10 | 0.20 | 1.00 | 1.00 | 0.10 | 0.20 |
| VOLUME, L | | 0.16 | 0.08 | 1.00 | 1.06 | 0.10 | 0.08 | 1.00 | 1.00 | 0.10 | 0.08 |
| ENTHALPY, cal | | -6.452E+05 | -6.508E+05 | -3.791E+06 | -4.065E+06 | -3.657E+05 | -6.572E+05 | -3.791E+06 | -3.784E+06 | -3.731E+05 | -6.575E+05 |

*FIG. 2 (CONT.)*

| STREAM | | | DST INITIAL AQUEOUS | DST INITIAL SOLID | LEACHED Al(OH)3 AQUEOUS | Mg(NO3)2.6H2O AQUEOUS | Mg(NO3)2.6H2O SOLID | PRECIP AQUEOUS | PRECIP SOLID | FILTRATE AQUEOUS |
|---|---|---|---|---|---|---|---|---|---|---|
| PHASE | | | | | | | | | | |
| TEMPERATURE, C | | | 25.00 | 25.00 | 90.00 | 25.00 | 25.00 | 90.00 | 90.00 | 75.00 |
| PRESSURE, ATM | | | 1.00 | 1.00 | 1.00 | 1.00 | 1.00 | 1.00 | 1.00 | 1.00 |
| pH | | | 15.23 | - | 13.13 | 7.00 | - | 7.65 | - | 7.68 |
| COMPONENT | FORMULA | gm/gmol | gm | gm | gm | gm | gm | gm | gm | gm |
| WATER | H2O | 18.02 | 1,150.00 | | 1,150.00 | 365.20 | | 1,836.34 | | 894.94 |
| CARBON DIOXIDE | CO2 | 44.01 | 0.00 | | 0.00 | | | 0.15 | | 0.06 |
| NITRIC ACID | HNO3 | 63.01 | 0.00 | | 0.00 | | | 26.22 | | 12.78 |
| ALUMINUM HYDROXIDE | Al(OH)3 | 78.00 | 79.80 | 11.00 | 90.80 | | | 0.00 | 2.93 | 0.00 |
| POTASSIUM HYDROXIDE | KOH | 56.11 | 22.60 | | 22.60 | | | 22.60 | | 11.01 |
| SODIUM HYDROXIDE | NaOH | 40.00 | 194.70 | | 194.70 | | | - | | - |
| SODIUM NITRITE | NaNO2 | 69.00 | 160.00 | | 160.00 | | | 160.00 | | 77.98 |
| SODIUM NITRATE | NaNO3 | 84.99 | 191.40 | | 191.40 | | | 730.49 | | 356.01 |
| SODIUM CARBONATE | Na2CO3 | 105.99 | 98.00 | | 97.99 | | | 1.74 | | 0.82 |
| SODIUM SULFATE | Na2SO4 | 142.04 | 2.50 | | 2.50 | | | 2.50 | | 1.22 |
| SODIUM CHLORIDE | NaCl | 58.44 | 13.60 | | 13.60 | | | 13.60 | | 6.63 |
| SODIUM BICARBONATE | NaHCO3 | 84.01 | 0.00 | | 0.00 | | | 28.70 | | 14.04 |
| SODIUM CHROMATE | Na2CrO4 | 161.97 | 1.00 | | 1.00 | | | 1.00 | | .049 |
| CESIUM HYDROXIDE | CsOH | 149.91 | 2.00 | | 2.00 | | | 2.00 | | 0.97 |
| MAGNESIUM NITRATE HEXAHYDRATE | Mg(NO3)2.6H2O | 256.41 | | | | | 866.50 | | | |
| MAGNESIUM HYDROTALCITE | Mg6CO3Al2(OH)16.3H2O | 585.97 | | | | | | | 330.04 | |
| TOTAL, gm | | | 1,915.60 | 11.00 | 1,926.60 | 365.20 | 866.50 | 2,825.34 | 332.96 | 1,376.93 |
| VOLUME, L | | | 1.43 | 0.00 | 1.50 | 0.37 | 0.55 | 2.38 | 0.00 | 1.14 |
| ENTHALPY, cal | | | -5.965E+06 | -4.360E+04 | -5.922E+06 | -1.385E+06 | -2.112E+06 | -8.118E+06 | -1.129E+06 | -3.973E+06 |
| DENSITY, g/L | | | 1,338.57 | 2,440.66 | 1,280.88 | 996.85 | 1,579.83 | 1,185.89 | 247,438.00 | 1,203.97 |

FIGURE 4 - MAGNESIUM HYDROTALCITE MATERIAL BALANCE

*FIG. 4*

| STREAM | | | CAKE1 | CAKE1 | WASH1 | SPENT WASH1 | CAKE2 | CAKE2 | WASH2 | SPENT WASH2 | CAKE3 | CAKE3 |
|---|---|---|---|---|---|---|---|---|---|---|---|---|
| PHASE | | | AQUEOUS | SOLID | AQUEOUS | AQUEOUS | AQUEOUS | SOLID | AQUEOUS | AQUEOUS | AQUEOUS | SOLID |
| TEMPERATURE, C | | | 75.00 | 75.00 | 25.00 | 43.49 | 43.49 | 43.49 | 25.00 | 31.13 | 31.13 | 31.13 |
| PRESSURE, ATM | | | 1.00 | 1.00 | 1.00 | 1.00 | 1.00 | 1.00 | 1.00 | 1.00 | 1.00 | 1.00 |
| pH | | | 7.68 | - | 7.00 | 7.98 | 7.98 | - | 7.00 | 8.25 | 8.25 | - |
| COMPONENT | FORMULA | gm/gmol | gm | gm | gm | gm | gm | gm | gm | gm | gm | gm |
| WATER | $H_2O$ | 18.02 | 941.39 | - | 2,000.01 | 2,069.36 | 852.03 | - | 2,000.01 | 1,902.06 | 949.98 | - |
| CARBON DIOXIDE | $CO_2$ | 44.01 | 0.06 | | | 0.03 | 0.01 | | | 0.01 | 0.00 | |
| NITRIC ACID | $HNO_3$ | 63.01 | 13.44 | | | 9.55 | 3.89 | | | 2.60 | 1.30 | |
| ALUMINUM HYDROXIDE | $Al(OH)_3$ | 78.00 | 0.00 | 2.93 | | 0.00 | 0.00 | 2.93 | | 0.00 | 0.00 | 2.93 |
| POTASSIUM HYDROXIDE | KOH | 56.11 | 11.59 | | | 8.23 | 3.36 | | | 2.24 | 1.12 | |
| SODIUM HYDROXIDE | NaOH | 40.00 | | | | | | | | | | |
| SODIUM NITRITE | $NaNO_2$ | 69.00 | 82.02 | | | 58.26 | 23.76 | | | 15.85 | 7.91 | |
| SODIUM NITRATE | $NaNO_3$ | 84.99 | 374.48 | | | 266.01 | 108.48 | | | 72.35 | 36.13 | |
| SODIUM CARBONATE | $Na_2CO_3$ | 105.99 | 0.86 | | | 0.59 | 0.24 | | | 0.16 | 0.08 | |
| SODIUM SULFATE | $Na_2SO_4$ | 142.04 | 1.28 | | | 0.91 | 0.37 | | | 0.25 | 0.12 | |
| SODIUM CHLORIDE | NaCl | 58.44 | 6.97 | | | 4.95 | 2.02 | | | 1.35 | 0.67 | |
| SODIUM BICARBONATE | $NaHCO_3$ | 84.01 | 14.77 | | | 10.52 | 4.29 | | | 2.87 | 1.43 | |
| SODIUM CHROMATE | $Na_2CrO_4$ | 161.97 | 0.51 | | | 0.36 | 0.15 | | | 0.10 | 0.05 | |
| CESIUM HYDROXIDE | CsOH | 149.91 | 1.03 | | | 0.73 | 0.30 | | | 0.20 | 0.10 | |
| MAGNESIUM NITRATE HEXAHYDRATE | $Mg(NO_3)_2 \cdot 6H_2O$ | 256.41 | | | | | | | | | | |
| MAGNESIUM HYDROTALCITE | $Mg_6CO_3Al_2(OH)_{16} \cdot 3H_2O$ | 585.97 | | 330.04 | | | | 330.04 | | | | 330.04 |
| TOTAL, gm | | | 1,448.40 | 332.97 | 2,000.01 | 2,449.51 | 998.90 | 332.97 | 2,000.01 | 2,000.01 | 998.90 | 332.97 |
| VOLUME, L | | | 1.20 | 0.00 | 2.01 | 2.25 | 0.92 | 0.00 | 2.01 | 1.95 | 0.97 | 0.00 |
| ENTHALPY, cal | | | -4.179E+06 | -1.130E+06 | -7.584E+06 | -8.363E+06 | -3.406E+06 | -1.133E+06 | -7.584E+06 | -7.329E+06 | -3.660E+06 | -1.134E+06 |
| DENSITY, g/L | | | 1,203.97 | 247,310.00 | 996.85 | 1,086.82 | 1,086.82 | 247,290.00 | 996.85 | 1,027.26 | 1,027.26 | 247,292.00 |

*FIG. 4 (CONT.)*

PROCESS FOR REMOVAL OF ALUMINUM OXIDES FROM AQUEOUS MEDIA

FIELD OF THE INVENTION

The present invention relates to the use of lithium salts and/or magnesium salts for precipitating aluminum oxides present in aqueous media.

BACKGROUND OF THE INVENTION

The process of producing pure alumina from bauxite (the Bayer process) has not significantly changed in the last 100 years. The Bayer process can be considered in three stages: (1) leaching, (2) precipitation and (3) calcination.

In the leaching stage, aluminum-bearing minerals in bauxite (e.g., gibbsite, böhmite and diaspore) are selectively leached from insoluble components by dissolving them in an aqueous solution of sodium hydroxide:

(gibbsite): $Al(OH)_3 + Na^+ + OH^- \rightarrow Al(OH)_4^- + Na^+$ (böhmite and diaspore): $AlO(OH) + Na^+ + OH^- + H_2O \rightarrow Al(OH)_4^- + Na^+$ Before being subjected to the Bayer process, the bauxite ore is pulverized and milled to reduce the particle size, which increases the available surface area for contact with the sodium hydroxide. The crushed bauxite is then combined with the process liquor and delivered as a slurry to a heated pressure digester vessel. Conditions within the digester vessel (e.g., concentration, temperature and pressure) are set according to the properties of the bauxite ore. Ores with a high gibbsite content can typically be processed at about 140° C., while processing of ores with a high böhmite content typically requires temperatures between about 200° C. and about 240° C. The pressure is defined by the steam pressure during actual process conditions. At 240° C., the pressure is about 35 atmospheres.

After the leaching stage, the insoluble bauxite residue must be separated from the dissolved alumina-containing liquor by a combined process of precipitation and settling. The liquor is typically purified through a series of filters before being transferred to the precipitators.

The alumina in the alumina-containing liquor is precipitated by cooling in the form of aluminum trihydroxide (gibbsite):

$Al(OH)_4^- + Na^+ \rightarrow Al(OH)_3 + Na^+ OH^-$

The gibbsite precipitation step is basically the reverse of the leaching step, except that the nature of the aqueous media alumina product is carefully controlled by reaction conditions, including seeding or selective nucleation, precipitation temperature and cooling rate. During the precipitation process sodium hydroxide is regenerated for additional alumina leaching. The purified crystalline gibbsite, which is also referred to as a hydrate, is then separated from the liquor and calcined to form alumina for the aluminum smelting process.

$2Al(OH)_3 \rightarrow Al_2O_3 + H_2O$

As the result of Cold War weapons material production, large volumes of radioactive and chemically hazardous aqueous wastes, which include aluminum oxides, have been generated at the U.S. Department of Energy (DOE) facilities. These wastes are stored in storage tanks at various locations, for example the DOE Hanford site in Washington State. At present, the DOE Hanford site stores approximately 53 million gallons of radioactive aqueous waste in approximately 177 underground tanks. This waste must be processed in the Hanford Waste Tank Treatment and Immobilization Plant (WTP) to immobilize (vitrify) the radioactive waste constituents.

One processing problem at the Hanford site relates to the presence of aluminum oxides (e.g., alumina) in the aqueous waste that forms a sludge that impairs transfer and processing of the waste. Over 44,00 metric tons of sodium salts are present in the aqueous waste and an additional estimated 30,000 metric tons of sodium as sodium hydroxide are required to leach (i.e., solubilize) insoluble alumina sludge. This additional amount of sodium salts increases both the glass volume and treatment schedule at the WTP. Further, soluble alumina can plug WTP process equipment by forming amorphous gels during any of a number of processes (e.g., filtration, ion-exchange, cooling, dilution and/or neutralization) utilized in WTP operations.

The inventors have discovered that the addition of lithium salts and/or magnesium salts to aqueous media containing aluminum oxides results in the formation of low solubility lithium-aluminate complexes and/or magnesium-aluminate complexes that provide a quick and effective way of separating soluble alumina from the aqueous media. This novel process is well-suited to address the aqueous waste problems present at the Hanford site. The separated lithium-aluminate complexes and magnesium-aluminate complexes may be beneficially used as glass formers in the production of vitrified low activity waste (LAW).

The advantages of using lithium salts and/or magnesium salts to remove aluminum oxides from aqueous media, are at the very least as follows: (1) the per-pass yield for the precipitated lithium-aluminate complex or the magnesium-aluminate complex is greater than for a modified Bayer process; (2) removal of aluminum oxides by lithium and/or magnesium as described herein does not require seeding or seed recycle; and (3) the precipitation of lithium-aluminate complexes and magnesium-aluminate complexes forms large crystals that may be readily beneficially separated and decontaminated from aqueous media.

SUMMARY OF THE INVENTION

An aspect of the invention is a method for removing soluble aluminum oxides from an aqueous medium comprising contacting a lithium salt with the media; collecting the resulting precipitated lithium-aluminate complex; and optionally washing the collected lithium-aluminate complex.

Another aspect of the invention is a method for removing soluble aluminum oxide from an aqueous medium comprising contacting a magnesium salt with the media; collecting the resulting precipitated magnesium-aluminate complex; and optionally washing the collected magnesium-aluminate complex.

BRIEF DESCRIPTION OF THE DRAWINGS

The following figures represent specific embodiments of the invention and are not intended to otherwise limit the scope of the invention.

FIG. 2 depicts the material balance of the example given in FIG. 1.

FIG. 4 depicts the material balance of the example given in FIG. 3.

DETAILED DESCRIPTION OF THE INVENTION

Definitions

Figure 1:
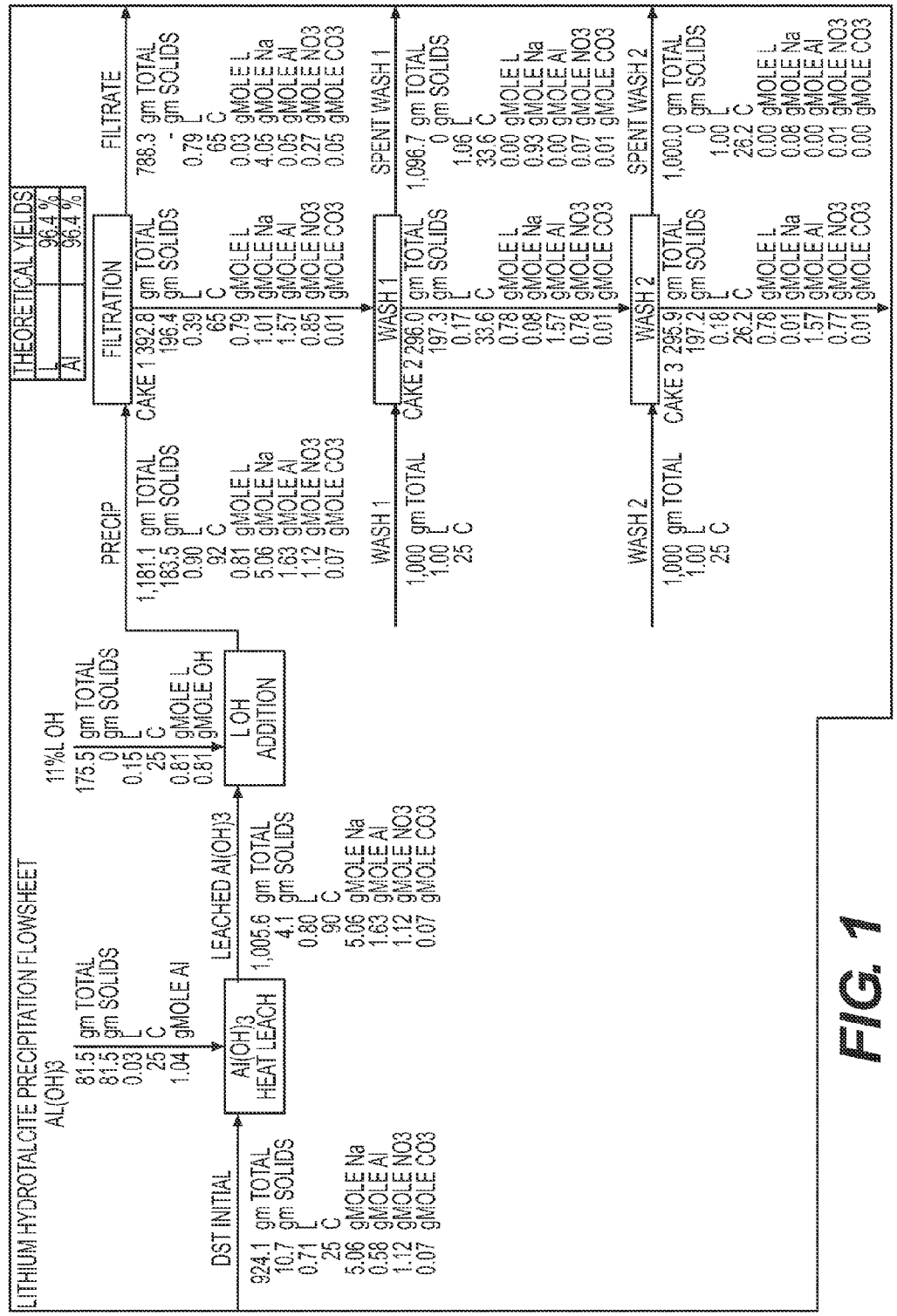
FIG. 1 depicts an exemplary embodiment of the invention in which alumina is removed via precipitation from an aqueous media using lithium salts. In this example, the caustic feed solution is heated to a temperature of 90° C. and $Al(OH)_3$ is leached into the feed solution to saturate the solution with alumina at that temperature. A solution of 40 wt % $LiNO_3$ (lithium nitrate) is added to the saturated solution. The reaction produces lithium-aluminate complex salts, generally of the formula $Li_2CO_3 \cdot 2Al(OH)_3 \cdot 3H_2O$. These salts are separated from the solution by filtration. The filter cake containing the lithium-aluminate salts is washed on the filter with deionized water to remove impurities from the precipitate.
Figure 3:
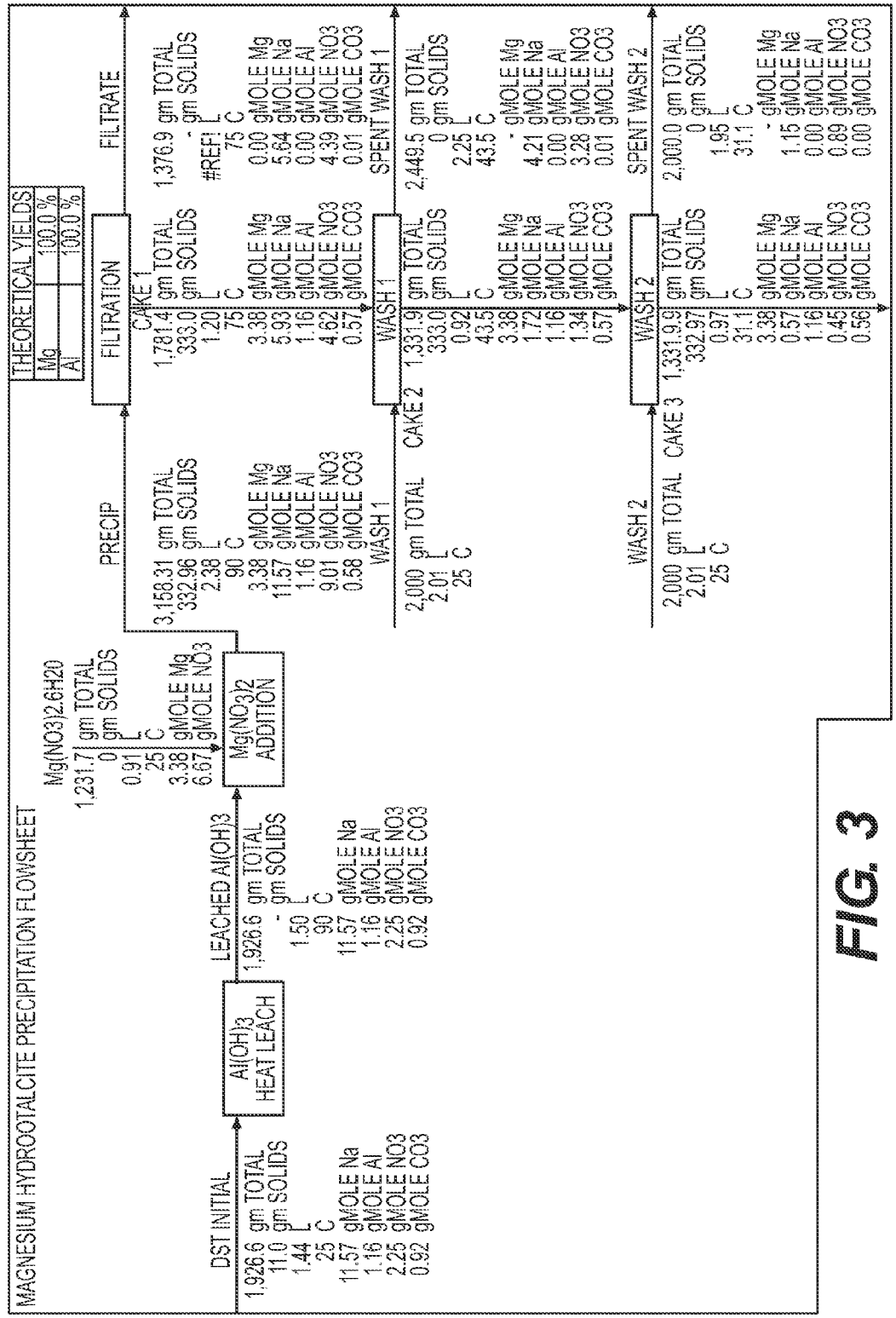
FIG. 3 depicts an exemplary embodiment of the invention in which alumina is removed via precipitation from an aqueous media using magnesium salts. In this example, the aqueous waste solution containing soluble and insoluble alumina (Al(OH)$_3$) is heated to a temperature of 90° C. to leach solid alumina into solution. A solution of 40 wt % Mg(NO$_3$)$_2$ (magnesium nitrate) is added to the solution. The reaction produces magnesium hydrotalcites (e.g., magnesium carbonate complexes, generally of the formula Mg$_6$CO$_3$Al$_2$(OH)$_{16}$.3H$_2$O). These complexes are separated from the solution by filtration. The filter cake containing the hydrotalcite is washed on the filter with deionized water to remove impurities from the precipitate.

Unless defined otherwise, all technical and scientific terms used herein generally have the same meaning as commonly understood by one of ordinary skill in the art to which this invention belongs.

As defined herein, "lithium" or "lithium salt" refers to an organic or inorganic lithium-containing salt that is at least partially soluble in water. Exemplary embodiments include, but are not limited to, lithium bicarbonate (LiHCO$_3$), lithium hydroxide (LiOH), lithium nitrite (LiNO$_2$), lithium nitrate (LiNO$_3$), lithium bromide (LiBr), lithium chloride (LiCl), lithium fluoride (LiF), lithium phosphate (Li$_3$PO$_4$), lithium sulfate (Li$_2$SO$_4$), lithium acetate (LiAc) and lithium citrate (Li$_3$C$_6$H$_5$O$_7$.4H$_2$O).

In an exemplary embodiment of the invention, the lithium salt includes, but is not limited to, Li$_2$CO$_3$, LiHCO$_3$, LiOH, LiNO$_2$, LiBr, LiCl, LiF, Li$_3$PO$_4$, Li$_2$SO$_4$, LiNO$_3$, LiAc and mixtures thereof.

In an exemplary embodiment, the lithium salt is lithium nitrate.

As defined herein, "magnesium" or "magnesium salt" refers to an organic or inorganic magnesium-containing salt that is at least partially soluble in water. Exemplary embodiments include, but are not limited to, magnesium bicarbonate (Mg(HCO$_3$)$_2$), magnesium hydroxide (Mg(OH)$_2$), magnesium nitrite (Mg(NO$_2$)$_2$), magnesium nitrate (Mg(NO$_3$)$_2$), magnesium bromide (MgBr$_2$), magnesium chloride (MgCl$_2$), magnesium fluoride (MgF$_2$), magnesium phosphate (Mg$_3$(PO$_4$)$_2$), magnesium sulfate (MgSO$_4$), magnesium acetate (Mg(Ac)$_2$) and magnesium citrate (Mg$_3$(C$_6$H$_5$O$_7$)$_2$.4H$_2$O).

In an exemplary embodiment of the invention, the magnesium salt includes, but is not limited to, MgCO$_3$, Mg(HCO$_3$)$_2$, Mg(OH)$_2$, Mg(NO$_2$)$_2$, MgBr$_2$, MgCl$_2$, MgF$_2$, Mg$_3$(PO$_4$)$_2$, MgSO$_4$, Mg(NO$_3$)$_2$, MgAc and mixtures thereof.

As defined herein, "aluminum oxides" refer to molecules containing both aluminum and oxygen, in various states of hydration, that are at least partially soluble in water. Aluminum oxides include, but are not limited to, alumina (Al$_2$O$_3$), aluminum trihydroxide (hydrated alumina and Al(OH)$_3$) and aluminum oxy hydroxide (AlO(OH)).

In an exemplary embodiment of the invention, the aluminum oxide includes, but is not limited to, Al$_2$O$_3$, Al(OH)$_3$, AlO(OH) and mixtures thereof.

In one embodiment of the invention, a lithium salt and/or a magnesium salt is utilized to precipitate leached alumina from aqueous media, through the precipitation of lithium-aluminate complexes and/or magnesium-aluminate complexes, respectively.

In an exemplary embodiment, the leached alumina is in the form of the aqueous aluminate ion (e.g., Al(OH)$_4^{-1}$).

In an exemplary embodiment, the lithium-aluminate complex or the magnesium-aluminate complex is a hydrotalcite.

In exemplary embodiments of the invention, the temperature of the aqueous media during the formation and precipitation of the lithium-aluminate and/or magnesium-aluminate salts ranges from about 35° C. to about 150° C., such as from about 40° C. to about 120° C., such as from about 40° C. to about 100° C., such as from about 50° C. to about 100° C., such as about 75° C. to 95° C.

In an exemplary embodiment of the invention, the lithium-aluminate complexes are crystalline and have the general formula (LiA$_x$)$_y$.2Al(OH)$_3$.nH$_2$O and the lithium-aluminate complex precipitation reaction is illustrated by the following reaction:

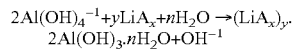
2Al(OH)$_4^{-1}$+yLiA$_x$+nH$_2$O →(LiA$_x$)$_y$.
2Al(OH)$_3$.nH$_2$O+OH$^{-1}$ wherein A is an anion including, but not limited to, OH$^{-1}$, NO$_3^{-1}$, NO$_2^{-1}$, HCO$_3^{-1}$, Cl$^{-1}$, F$^{-1}$, SO$_4^{-2}$, CO$_3^{-2}$, PO$_4^{-3}$; n is an integer selected from 1 to 3; y is the number of lithium atoms present for each two aluminum atoms and is an integer selected from 0.5 to 1.2; A is a counterion to the lithium and has a negative valence of 1, 2, or 3; and x is the negative reciprocal of the valence of A (i.e., x is 1, ½ or ⅓, respective to when A is −1, −2 or −3). The presence of the anion A may be due to the addition of the lithium salt (LiA) to the aqueous media or it may already have been present in the aqueous media before the addition of the lithium salt.

In an exemplary embodiment, the lithium-aluminate-carbonate complex formed is dilithium carbonate tetra(aluminum trihydroxide) trihydrate (Li$_2$CO$_3$.4Al(OH)$_3$.3H$_2$O) ("LAHCS"). The source of carbonate includes, but is not limited to, sodium carbonate (Na$_2$CO$_3$), sodium bicarbonate (NaHCO$_3$), potassium carbonate (K$_2$CO$_3$), potassium bicarbonate (KHCO$_3$), lithium carbonate (Li$_2$CO$_3$), lithium bicarbonate (LiHCO$_3$), magnesium carbonate (MgCO$_3$), and carbon dioxide (CO$_2$). Lithium aluminate carbonate complexes are described in U.S. Pat. No. 5,997,836, which is incorporated by reference in its entirety. The overall reaction that leads to this particular lithium-carbonate-aluminum complex is as follows, where LiA represents the lithium salt and CO$_3^{-2}$ represents a carbonate source:

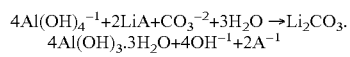
4Al(OH)$_4^{-1}$+2LiA+CO$_3^{-2}$+3H$_2$O →Li$_2$CO$_3$.
4Al(OH)$_3$.3H$_2$O+4OH$^{-1}$+2A$^{-1}$ Other anions may be substituted for carbonate in the lithium-aluminate complexes, as represented by the following reaction:

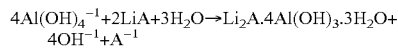
4Al(OH)$_4^{-1}$+2LiA+3H$_2$O→Li$_2$A.4Al(OH)$_3$.3H$_2$O+
4OH$^{-1}$+A$^{-1}$ where A may be an anion of the group (OH$^{-1}$, NO$_3^{-1}$, NO$_2^{-1}$, HCO$_3^{-1}$, CO$_3^{-2}$, Cl$^{-1}$, F$^{-1}$, SO$_4^{-2}$). The anion by be donated from the lithium salt added to the waste, or the anion may be a component of the waste.

The above reaction is reported to occur rapidly at temperatures from about 40° C. to about 95° C. and a pH from about 7 to above 14. The reaction may occur in basic solution where the free hydroxide concentration is higher than 0.1 molar—i.e., at a pH above about 14.

In an exemplary embodiment, the Al(OH)$_3$ is in a colloidal (gel) form and an acid (i.e., HNO$_3$, CO$_2$) is used to partially neutralize a waste mixture, followed by the addition of a lithium salt (LiA) to precipitate the alumina as lithium aluminate complexes. Typically, the lithium aluminate complexes have an isometric crystal habit which allows for easy separation, deliquoring and decontamination.

In an exemplary embodiment, the formation of lithium-aluminate complex salts are accomplished by the reaction of the lithium salt with soluble alumina, or with alumina in a gel form or solid phase alumina.

In other exemplary embodiments, lithium aluminate complexes can form a solid precipitate in aqueous media when, for the structure $$(LiA_x)_y \cdot 2Al(OH)_3 \cdot nH_2O$$

wherein
A is an anion of negative valence −1, −2, or −3;
x is the negative reciprocal of the valence A (i.e., x is 1, ½ or ⅓, respective to A being −1, −2, or −3); $0.1 \leq y \leq 1.0$; and $0 \leq n \leq 10$.

Thus, the Li/Al mole ratio can vary from approximately 0.16 to 1.6. In low-activity waste (LAW) glass, lithium carbonate is added as a glass former in the mole ratio of 2:1 Li:Al so that if lithium is used to precipitate lithium aluminate complexes, there is no net increase in LAW glass volume and the cost impact of adding lithium in the lithium-aluminate process becomes negligible.

In an exemplary embodiment, once the aluminum oxide (for example, alumina) has been precipitated from an aqueous media as a lithium-aluminate salt, the aqueous media becomes regenerated in hydroxide (OH$^{-1}$) by the reaction:

$$4Al(OH)_4^{-1} + 2LiA + 3H_2O \rightarrow Li_2A \cdot 4Al(OH)_3 \cdot 3H_2O + 4OH^{-1} + A^{-1}$$

Upon separation of the precipitated lithium-aluminate salt, the aqueous media may be recycled for additional aluminum oxide sludge leaching, thereby reducing or eliminating the need for adding large quantities of sodium hydroxide to dissolve the aluminum oxide sludge.

In an exemplary embodiment, once the aluminum oxide (for example, alumina) has been precipitated from an aqueous media via a lithium-aluminate salt and no additional hydroxide is required for further alumina leaching, the presence of hydroxide (for example, sodium hydroxide) is longer necessary in the aqueous media to maintain solubility of aluminum oxides. Therefore, the remaining hydroxide may be destroyed by partial neutralization of the solution by the action of an acid:

$$NaOH + HA_x \rightarrow NaA_x + H_2O$$

where the acid may be organic (such as, for example, acetic acid, citric acid or fumaric acid) or inorganic (such as, for example, hydrochloric acid, sulfuric acid or nitric acid). A may be an anion of the group (NO$_3^{-1}$, NO$_2^{-1}$, HCO$_3^{-1}$, Cl$^{-1}$, F$^{-1}$CO$_2^{-2}$, SO$_4^{-2}$), and x is the negative reciprocal of the valence of A (i.e., x is 1 or ½ respective when A is −1 or −2).

By neutralization reactions sodium hydroxide is converted to a sodium salt thereby lowering the free hydroxide concentration of the solution. Once the highly soluble aluminum and hydroxide salts have been removed from the aqueous medium, the viscosity of the medium is significantly lowered allowing simpler downstream processing of the aqueous waste.

In an exemplary embodiment of the invention, the magnesium-aluminate complexes are crystalline and have the general formula Mg$_6$A·Al$_2$(OH)$_{16}$·nH$_2$O and the magnesium-aluminate complex precipitation reaction is illustrated by the following reaction:

$$2Al(OH)_4^{-1} + 6MgA_x + 8OH^{-1} + nH_2O \rightarrow Mg_6A_x \cdot Al_2(OH)_{16} \cdot nH_2O + (5x)A^{x-3}$$

wherein A may be an anion including, but not limited to OH$^{-1}$, NO$_3^{-1}$, NO$_2^{-1}$, HCO$^{-1}$, Cl$^{-1}$, F$^{-1}$, SO$_4^{-2}$, CO$_3^{-2}$; n is an integer selected from 1 to 4; A is a counterion to the magnesium and has a negative valence of 1 or 2; and x is the valence of A plus three (i.e., x is 2 or 1, respective to when A is −1 or −2). The presence of the anion A may be due to the addition of the magnesium salt (MgA) to the aqueous media or it may already have been present in the aqueous media before the addition of the magnesium salt. The hydroxide ion may be present in the aqueous media before the addition of the magnesium salt, it may be added as an additional salt (e.g. NaOH), or may be supplied by the magnesium salt (e.g., Mg(OH)$_2$).

The above reaction is reported to occur rapidly at temperatures from about 40° C. to about 95° C. and a pH from about 7 to above 14. The reaction may occur in basic solution where the free hydroxide concentration is higher than 0.1 molar—i.e., at a pH above about 14.

In an exemplary embodiment, the solids formed in the reaction between the lithium and alumina can be separated, deliquored and washed by ordinary separations equipment (e.g., filters, hydrocyclones, and centrifuges).

In an exemplary embodiment, the magnesium hydrotalcite complex formed is hexamagnesium carbonate dialuminum hexadecahydroxide trihydrate Mg$_6$CO$_3$Al$_2$(OH)$_{16}$·3H$_2$O. The source of carbonate includes, but is not limited to, not limited to, sodium carbonate (Na$_2$CO$_3$), sodium bicarbonate (NaHCO3), potassium carbonate (K$_2$CO$_3$), potassium bicarbonate (KHCO$_3$), magnesium carbonate (MgCO$_3$), magnesium bicarbonate (Mg(HCO$_3$)$_2$), and carbon dioxide. The generalized reaction that leads to this particular magnesium-carbonate-hydrotalcite complex is as follows, where A represents a divalent anion, MgA represents the magnesium salt and CO$_3^{-2}$ represents a carbonate source:

$$4Al(OH)_4^{-1} + 6MgA + CO_3^{-2} + 8OH^{-1} + 3H_2O \rightarrow Mg_6CO_3Al_2(OH)_{16} \cdot 3H_2O + 6A^{-2}$$

The above reaction is reported to occur rapidly at temperatures from about 40° C. to about 95° C. and a pH from about 7 to above 14. The reaction may occur in basic solution where the free hydroxide concentration is higher than 0.1 molar—i.e., at a pH above about 14.

In an exemplary embodiment, the Al(OH)$_3$ is in a colloidal (gel) form and an acid (i.e., HNO$_3$, CO$_2$) is used to partially neutralize a waste mixture, followed by the addition of a magnesium salt (MgA) to precipitate the alumina as magnesium hydrotalcite complexes. Typically, the hydrotalcite complexes have an isometric crystal habit which allows for easy separation, deliquoring and decontamination.

In an exemplary embodiment, the formation of hydrotalcite complexes is accomplished by the reaction of a magnesium salt or a lithium salt with soluble alumina, or with alumina in a gel form or solid phase alumina.

In an exemplary embodiment, the formation of hydrotalcite complexes is accomplished by the reaction of a magnesium salt or a lithium salt with solid phase alumina in the form of an aluminosilicate gel or solid phase aluminosilicate.

In other exemplary embodiments, magnesium hydrotalcite complexes can form a solid precipitate in aqueous media when, for the structure $$(Mg_6A_x)_y \cdot Al_z(OH)_m \cdot nH_2O$$

wherein
A is anion of negative valence 1, 2, or 3;
x is the valence A plus three (i.e., 2 or 1 respective to A being −1 or −2).
$0.1 \leq y \leq 1.0$;
$0.1 \leq z \leq 6.0$;
$0 \leq m \leq 20$;
$0 \leq n \leq 10$.

Thus, the Mg/Al ratio can vary from approximately 0.1 to 3. In low-activity waste (LAW) glass, magnesium silicate is added as a glass former. Thus, there is no net increase in LAW glass volume and the cost impact of adding magnesium in the magnesium hydrotalcite process becomes negligible.

In an exemplary embodiment of the invention, the aqueous media in which the reaction with the lithium salts and/or magnesium salts occurs, further includes organic and/or inorganic residues. Inorganic residues encompass inorganic salts that include, but are not limited to, $NaNO_3$, $NaNO_2$, $NaAlO_2$, $Na_2CO_3$, $Na_2SO_4$, $NaF$, $Na_3PO_4$, $NaOH$, $KOH$, $Na_2CrO_4$ and mixtures thereof. Organic residues include, but are not limited to, $NaCOOH$, $Na(C_2H_3O_2)$, $Na_2C_2O_4$, and mixtures thereof.

In an exemplary embodiment of the invention, the aqueous medium is radioactive aqueous waste.

Without further description, it is believed that one of ordinary skill in the art can, using the preceding description and the following illustrative examples, make and utilize the compounds of the invention and practice the claimed methods. The following working examples describe embodiments of the present invention, and are not to be construed as limiting in any way the remainder of the disclosure.

EXPERIMENTAL

Example 1

The purpose of this experiment was to determine the effectiveness of a precipitating lithium-aluminate complexes in the form of $(LiA_x)_y \cdot 2Al(OH)_3 \cdot nH_2O$ from a waste simulant using lithium nitrate as the lithium salt. Lithium nitrate has a higher aqueous solubility than, for example, lithium carbonate. For this experiment, a non-radioactive waste simulant was used with aqueous chemistry similar to typical Hanford double-shell tank (DST) supernatant. The experiment was designed to maximize the yield of lithium-aluminate complexes and to estimate the rate of precipitation. The DST simulant contained dissolved inorganic salts such as $NaNO_3$, $NaNO_2$, $Na_2CO_3$, $Na_2SO_4$, $NaF$, $Na_3PO_4$, $NaOH$, $KOH$, $NaCrO_4$ and organic contaminants such as formate, oxalate, acetate and glycolate salts. The anions of these sodium salts may exchange with the anion of the lithium salt in the lithium-aluminate complex precipitation. A total of 924.1 g DST simulant solution was added to a 2 liter mixing vessel.

Gibbsite Leaching

The contents of the vessel were heated to 100° C., then 81.5 grams of gibbsite ($Al(OH)_3$) were added to the vessel to bring it to saturation with respect to alumina. The solution was mixed until clear.

Lithium Hydroxide Addition

The simulant was then cooled to 90° C. and 175.5 grams of 11 weight % aqueous solution of LiOH at 25° C. was gradually added at approximately 2 g/min. The reaction temperature was maintained at 90° C. during the 1 hour LiOH addition.

Filtration and Washing

The resulting slurry was cooled to 65° C. and filtered in a büchner funnel. Wet cake mass was 384.8 grams. The filter cake was washed with a total of 2 liters of deionized water at 25° C. Washed cake mass was 295.5 grams. Dry cake mass was 179.2 grams resulting in an aluminum yield of 91%. The Li/Al ratio of the cake was 0.71, indicating the formation of lithium-aluminate complexes.

Example 2

The purpose of the experiment was to determine the effectiveness of a precipitating magnesium hydrotalcite complexes in the form of $(Mg_6A_x)_y Al_z(OH)_m \cdot nH_2O$ from a waste simulant using magnesium nitrate as the magnesium salt. Magnesium nitrate has a higher aqueous solubility than, for example, magnesium carbonate. The waste simulant is similar to the chemical composition in Example 1. The experiment was designed to maximize the yield of hydrotalcite complexes and to estimate the rate of precipitation. The simulant contained dissolved inorganic salts such as $NaNO_3$, $NaNO_2$, $Na_2CO_3$, $Na_2SO_4$, $NaOH$, $KOH$, $NaCrO_4$ and alumina as $Al(OH)_3$. The anions of the sodium salts may exchange with the anion of the magnesium salt in the magnesium hydrotalcite complex precipitation. A total of 1926.6 g DST simulant solution was added to a 4 liter mixing vessel.

Gibbsite Leaching

The contents of the vessel were heated to 100° C. to dissolve solid phase alumina. The solution was mixed until clear.

Magnesium Nitrate Addition

The simulant was then cooled to 90° C. and 1,232 grams of 41 weight % aqueous solution of $Mg(NO_3)_2$ at 25° C. was gradually added at approximately 20 g/min. The reaction temperature was maintained at 90° C. during the 1 hour $Mg(NO_3)_2$ addition.

Filtration and Washing

The resulting slurry was cooled to 65° C. and filtered in a büchner funnel. Wet cake mass was 1784.6 grams. The filter cake was washed with a total of 4 liters of deionized water at 25° C. Washed cake mass was 1330 grams. Dry cake mass was 294 grams resulting in an aluminum yield of 88%. The Mg/Al ratio of the cake was 2.8, indicating the formation of magnesium hydrotalcite complexes.

Unless defined otherwise, all technical and scientific terms herein have the same meaning as commonly understood by one of ordinary skill in the art to which this invention belongs. Although any methods and materials, similar or equivalent to those described herein, can be used in the practice or testing of the present invention, the preferred methods and materials are described herein. All patents, publications and patent applications cited herein are incorporated herein by reference for the purpose of disclosing and describing specific aspects of the invention for which the publication is cited.

REFERENCES

All documents cited herein are incorporated by reference in their entireties.
1. U.S. Pat. No. 2,977,185
2. U.S. Pat. No. 2,980,490
3. U.S. Pat. No. 3,539,306
4. U.S. Pat. No. 4,116,858
5. U.S. Pat. No. 4,159,311
6. U.S. Pat. No. 4,348,295
7. U.S. Pat. No. 4,348,297
8. U.S. Pat. No. 4,656,156
9. U.S. Pat. No. 4,774,212
10. U.S. Pat. No. 4,883,533
11. U.S. Pat. No. 4,904,457
12. U.S. Pat. No. 5,075,472

13. U.S. Pat. No. 5,179,063
14. U.S. Pat. No. 5,356,567
15. U.S. Pat. No. 5,364,828
16. U.S. Pat. No. 5,360,859
17. U.S. Pat. No. 5,419,883
18. U.S. Pat. No. 5,997,836
19. U.S. Pat. No. 6,479,024
20. U.S. Pat. No. 7,084,085
21. C. Misra, A. J. Perotta "Composition and Properties of Synthetic Hydrotalcites", Clays and Clay Minerals, Vol. 40, No. 2, 145-150, 1992
22. A. J. Perotta, F. S. Williams "Hydrocalumite Formation in Bayer Liquor and its Promotional Effect on Oxalate Precipitation", Light Metals 1995
23. A. J. Perotta, F. S. Williams "Layer Double Hydroxide Formation in Bayer Liquor and its Promotional Effect on Oxalate Precipitation", Light Metals 1996
24. A. J. Perotta, F. S. Williams, L. Stonehouse "Layered Double Hydroxides for Treatment of Bayer Process Lake Water", Light Metals 1997

I claim:

1. A method for removing solubilized aluminum oxides from an aqueous medium comprising:
    providing the aqueous medium containing radioactive waste and solubilized aluminum oxides;
    adding a lithium salt to the aqueous medium to react with the solubilized aluminum oxides to form a precipitated lithium-aluminate complex;
    collecting the precipitated lithium-aluminate complex from the aqueous medium; and
    optionally washing the lithium-aluminate complex.

2. The method according to claim 1, wherein the lithium salt is selected from the group consisting of $Li_2CO_3$, $LiHCO_3$, LiOH, $LiNO_2$, LiCl, LiF, $Li_3PO_4$, $Li_2SO_4$, $LiNO_3$, LiAc and mixtures thereof.

3. The method according to claim 1, wherein the lithium salt is $LiNO_3$.

4. The method according to claim 1, wherein the aluminum oxide is selected from the group consisting of $Al_2O_3$, $Al(OH)_3$, AlO(OH) and mixtures thereof.

5. The method according to claim 1, wherein the aluminum oxide is $Al(OH)_3$.

6. The method according to claim 1, wherein the aqueous medium further comprises a dissolved inorganic salt selected from the group consisting of $NaNO_3$, $NaNO_2$, $Na_2CO_3$, $Na_2SO_4$, NaF, $Na_3PO_4$, NaOH, KOH, $Na_2CrO_4$ and mixtures thereof.

7. The method according to claim 1, wherein the lithium-aluminate complex is LAHCS.

8. The method according to claim 1, wherein the temperature of the aqueous medium during the adding step is at least about 50° C. to about 100° C.

9. The method according to claim 1, further comprising contacting the aqueous medium with a magnesium salt.

* * * * *